(12) United States Patent
Nakanishi et al.

(10) Patent No.: US 7,335,442 B2
(45) Date of Patent: Feb. 26, 2008

(54) BATTERY WITH CURRENT COLLECTOR PLATE WELDED TO ELECTRODE TERMINAL ASSEMBLY

(75) Inventors: Naoya Nakanishi, Kobe (JP); Kouichi Satoh, Kobe (JP); Atsuhiro Funahashi, Toyonaka (JP); Toshiyuki Nohma, Kobe (JP); Yasuhiro Yamauchi, Sumoto (JP); Noriyuki Miyazaki, Sumoto (JP)

(73) Assignee: SANYO Electric Co., Ltd., Osaka (JP)

( * ) Notice: Subject to any disclaimer, the term of this patent is extended or adjusted under 35 U.S.C. 154(b) by 387 days.

(21) Appl. No.: 10/633,418

(22) Filed: Aug. 4, 2003

(65) Prior Publication Data
US 2004/0023107 A1  Feb. 5, 2004

(30) Foreign Application Priority Data
Aug. 5, 2002  (JP) .............................. 2002-226840

(51) Int. Cl.
*H01M 2/26* (2006.01)
(52) U.S. Cl. ...................... 429/161; 429/178; 429/211
(58) Field of Classification Search ................ 429/161, 429/178
See application file for complete search history.

(56) References Cited

U.S. PATENT DOCUMENTS 6,007,943 A * 12/1999 Coetzer ...................... 429/104
2003/0064285 A1* 4/2003 Kawamura et al. ......... 429/181

FOREIGN PATENT DOCUMENTS

| JP | 11-339761 A | 12/1999 |
| JP | 2000-090908 | * 3/2000 |
| JP | 2001-345086 A | 12/2001 |
| JP | 2002-075323 | * 3/2002 |
| JP | 2002-170543 A | 6/2002 |
| WO | WO00/62356 | * 10/2000 |

* cited by examiner

*Primary Examiner*—Jonathan Crepeau
*Assistant Examiner*—Tony Chuo
(74) *Attorney, Agent, or Firm*—Kubovcik & Kubovcik (57) ABSTRACT

A battery including an electrode unit housed in a battery can and which generates electricity which can be taken out of the battery via a pair of negative and positive electrode terminals, wherein a terminal assembly is installed in the battery, a current collector plate is connected to an edge of an electrode of the electrode unit for connecting the electrode unit to the terminal assembly, and one or more than one connecting piece which is protrusively formed on a surface of the current collector plate is welded and secured to a base portion of the terminal assembly.

5 Claims, 12 Drawing Sheets

BATTERY WITH CURRENT COLLECTOR PLATE WELDED TO ELECTRODE TERMINAL ASSEMBLY

FIELD OF THE INVENTION

The present invention relates to a battery such as a lithium ion secondary battery in which an electrode unit which is an electricity generating element is housed in a battery can, and electricity generated by the electrode can be taken out from the can.

BACKGROUND OF THE INVENTION

Figure 13:
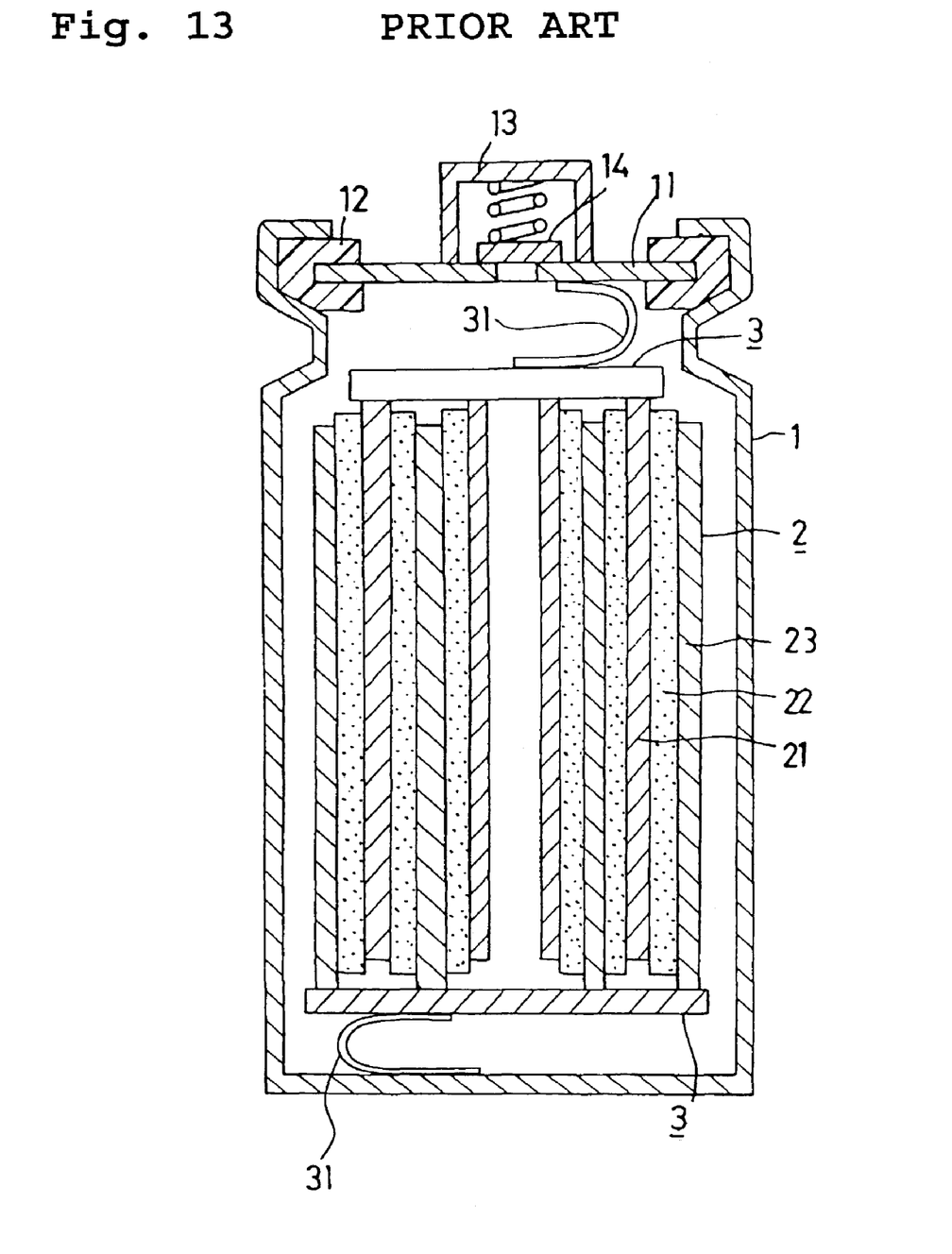
FIG. 13 is a cross sectional view of a conventional lithium ion secondary battery.

A lithium ion secondary battery having a high energy density has recently received attention as a power source for portable electronic equipment, electric vehicles, and the like. A cylindrical lithium ion secondary battery, as shown in FIG. 13, includes a spirally wound, or rolled-up, electrode unit (2) housed in a positive electrode can (1), and a sealing plate (11) fixed on an opening of the positive electrode can (1). An insulator (12) is placed between the positive electrode can (1) and the sealing plate (11). A negative electrode terminal (13) having a built-in gas vent valve (164) is connected to the sealing plate (11).

The spirally wound electrode (2) comprises a negative electrode (21), separator (22) and positive electrode (23), each in the form of a strip. The negative electrode (21) and the positive electrode (23) are shifted widthwise of the separator when they are placed on the separator (22) to be spirally wound. An edge of the negative electrode (21) projects outward beyond an edge of separator (22) at one axial end of the spiral electrode (2), and an edge of the positive electrode (23) projects outward beyond an edge of the separator (22) at the other axial end of the spirally wound electrode (2). Current collectors (3) are placed on both ends of the spirally wound electrode (2). The current collector on the negative electrode side is welded through a tab (31) onto a back of the sealing plate (11), and the current collector on the positive electrode side is welded onto the bottom of the positive electrode can (1) through a tab (31). This structure makes it possible to take out electricity generated by the spirally wound electrode (2) via a negative electrode terminal (13) and the positive electrode can (1). The negative electrode terminal (13) is made of nickel, copper or stainless steel that is stable at a negative electrode potential. The positive electrode can (1) is made of aluminum or aluminum alloy that is stable at a positive electrode potential.

Figure 14:
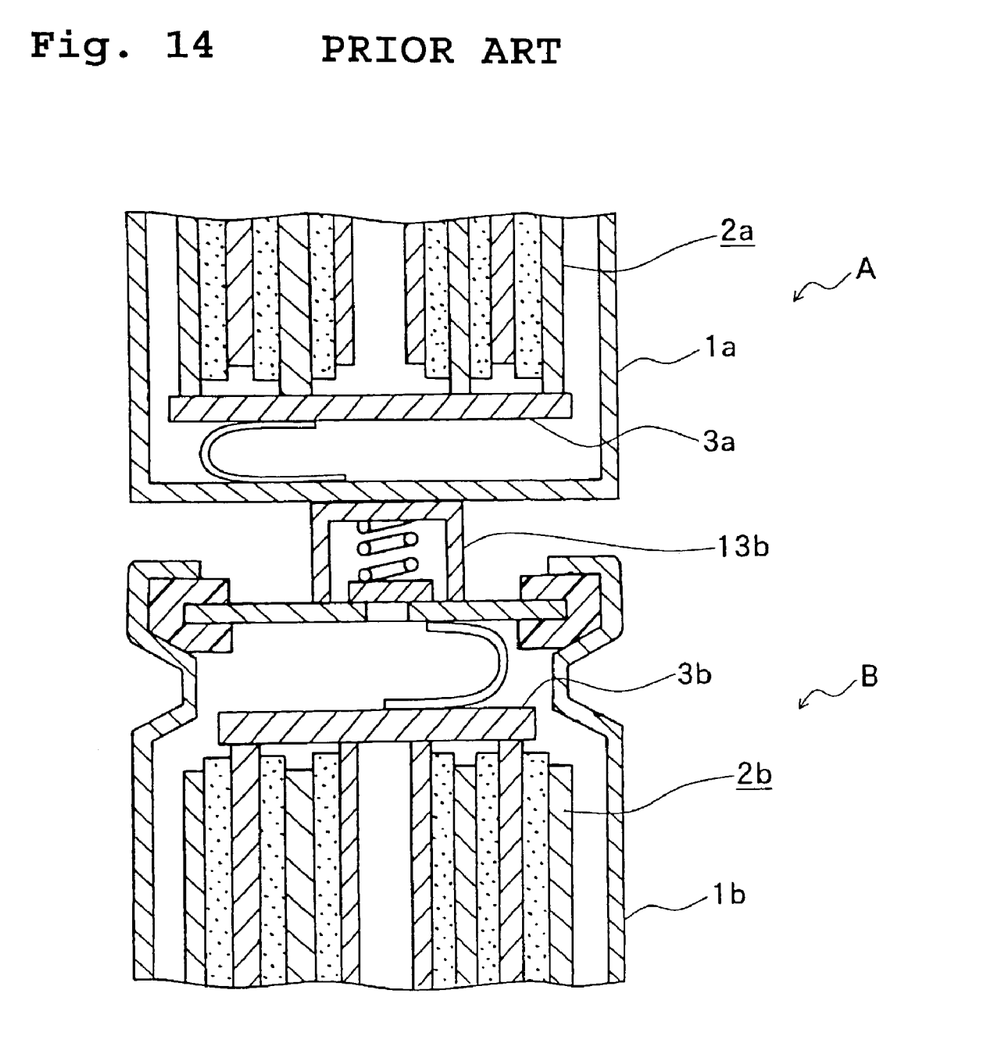
FIG. 14 is a cross sectional view of conventional batteries connected in series.

The above explained batteries are connected in series to obtain a desired output voltage as shown in FIG. 14.

However, a length of the current path of the spirally wound electrode unit (2) and the sealing plate (11) is long because a conventional lithium ion secondary battery as shown in FIG. 13 uses a tab (31) as a means for connecting the spirally wound electrode unit (2) and the sealing plate (11). The long current path increases internal resistance and decreases battery volume efficiency.

OBJECT OF THE INVENTION

An object of the present invention is to provide a battery in which the internal resistance is reduced and battery volume efficiency is increased.

SUMMARY OF THE INVENTION

A battery of the present invention includes an electrode unit housed in a battery can and which generates electricity which can be taken out of the battery via a pair of negative and positive electrode terminals, wherein a terminal assembly is installed in the battery, a current collector plate is connected to an edge of an electrode of the electrode unit for connecting the electrode unit to the terminal assembly, and one or more than one connecting piece which is protrusively formed on a surface of the current collector plate is welded and secured to a base portion of the terminal assembly.

EXPLANATION OF ELEMENTS 1, 1a: positive electrode can
2: spirally wound electrode unit of prior art battery
4: spirally wound electrode unit
5: battery can
6: current collector plate
7: negative electrode terminal assembly
8: negative electrode terminal
9: terminal connector part
11: sealing plate
12: insulator
13, 13b: negative electrode terminal
14: gas vent valve
21: negative electrode of prior art battery
22: separator of prior art battery
23: positive electrode of prior art battery
31: tab
41: negative electrode
42: separator
43: positive electrode
44: negative electrode active material
45: current collector 46: positive electrode active material
47: current collector
48: current collector edge
50: gas vent valve
51: cylinder
52: upper lid
53: base lid
54: groove
55, 55a: connecting plate
56: aluminum layer
57: nickel layer
58: hole
60: center hole
61: current collector plate
62: arc-shaped protrusion
63, 64: connecting piece
70: flange portion
71: terminal connector
72: first insulator
73: second insulator
76: rivet means
77: disc part
78: cylindrical part
79: rubber plug
81: nickel layer
82: aluminum layer
90: weld
91: circular recessed portion

DETAILED EXPLANATION OF THE INVENTION

In the present invention, one or more connecting pieces protrusively formed on a current collector plate is directly welded to the base portion of the terminal assembly to electrically connect the electrode unit and the terminal assembly so that the length of current path from the electrode unit to the terminal assembly is shortened as compared to a conventional tab connection and electrical resistance in the path becomes extremely low.

Direct welding of the current collector plate by way of the one or more connecting pieces to the base portion of the terminal assembly reduces deadspace in the battery can.

A flange portion (70) to be attached to an inner or outer circumferential wall of a connecting piece or pieces (63) is formed on and projects from the base portion of the terminal assembly and the flange portion (70) is welded to the connecting piece or pieces (63) by laser beam welding.

According to an embodiment of the present invention, the flange portion (70) and connecting piece or pieces (63) are connected at the same height from the electrode unit, and an increase of deadspace in a battery can, which is normally created in a battery can elongated in an axial direction due to the terminal assembly, is prevented.

According to another embodiment of the present invention, an outer circumferential wall of the connecting piece or pieces (63) and an inner circumferential wall of the flange portion (70) are brought into contact, and a laser beam is irradiated from outside the flange portion (70).

This arrangement makes the welding process easy and increases productivity.

DESCRIPTION OF PREFERRED EMBODIMENT

The present invention is described below in detail with reference to the drawings.

Entire Structure

Figure 1:
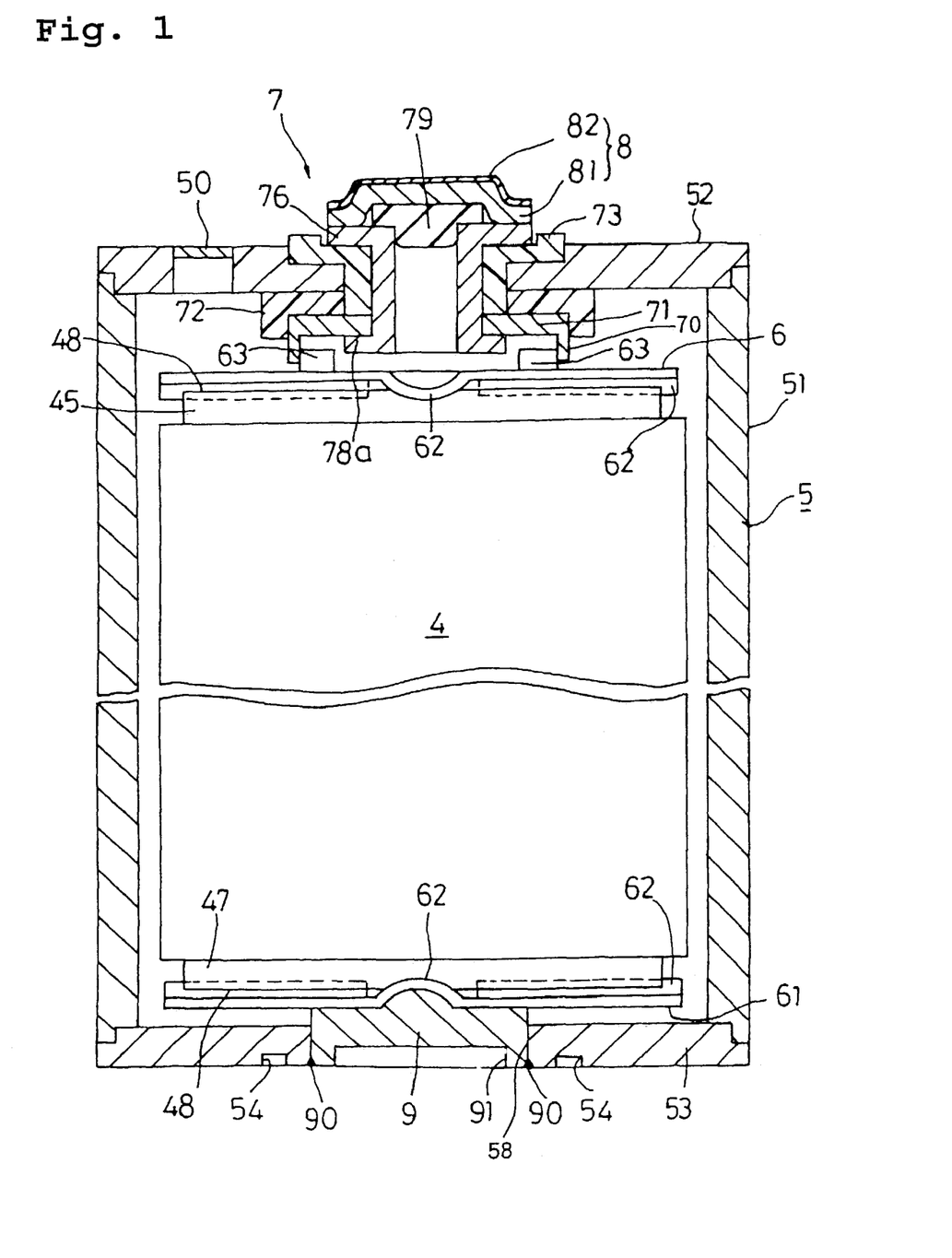
FIG. 1 is a cross sectional view of a lithium ion secondary battery of the present invention.

As shown in FIG. 1, a battery of the present invention comprises a spirally wound electrode unit (4) housed in a cylindrical battery can (5).

The battery can (5) comprises lids (52), (53) that are secured to openings of cylinder (51) by welding. The base lid (53) forms a positive electrode terminal. A negative electrode terminal assembly (7) is formed on the upper lid (52). A negative electrode terminal (8) which comprises a part of the negative electrode terminal assembly (7) forms a negative electrode terminal portion. Electricity generated in the electrode unit (4) can be taken out of the battery via the positive and negative electrode terminals. A gas vent valve (50) is formed on the upper lid (52) to release pressure when pressure inside the battery increases above a certain level.

Figure 2:
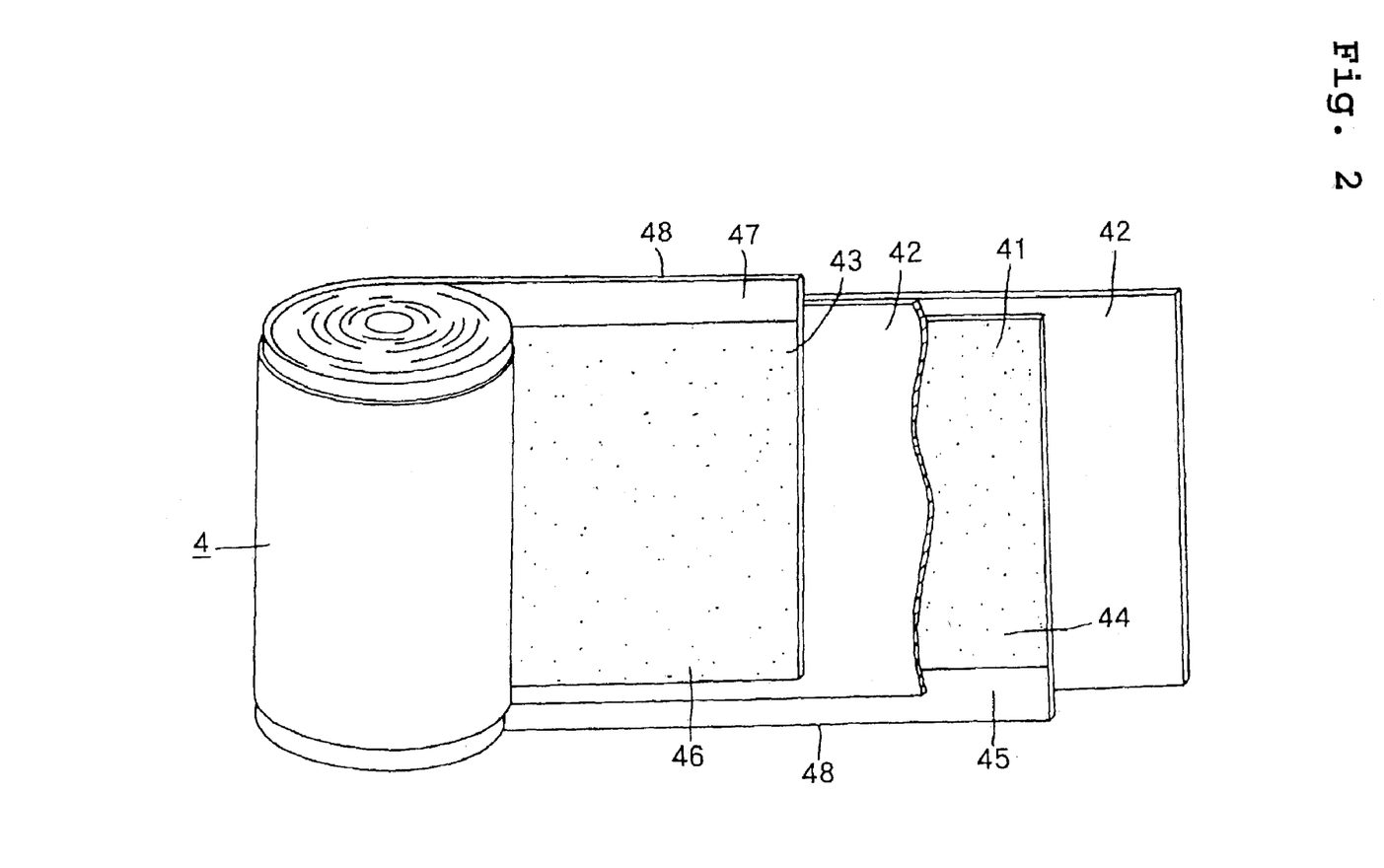
FIG. 2 is a perspective view, partly in development, of a spirally wound electrode unit.

As shown in FIG. 2, the spirally wound electrode unit (4) comprises a strip-like separator (42) sandwiched between a strip-like negative electrode (41) and a strip-like positive electrode (43) and spirally wound. The negative electrode (41) comprises a coating of a negative electrode active material (44) including carbon material coated on both sides of a strip-like current collector (45) made of a copper foil. The positive electrode (43) comprises a positive electrode active material (46), e.g., a lithium composite oxide, coated on both sides of a strip-like current collector (47). The separator (42) is impregnated with a nonaqueous electrolyte.

The negative electrode (41) includes a coated portion where the negative electrode active material (44) is coated and an uncoated portion not having the negative electrode active material (44) coated thereon. The positive electrode (43) also includes a coated portion where the positive electrode active material (46) is coated and an uncoated portion not having the positive electrode active material (46) coated thereon.

The negative electrode (41) and the positive electrode (43) are shifted, or displaced, in the widthwise direction relative to the separator (or axis of the electrode unit) when they are placed on the separator (42) so that the uncoated portions project outside of the edges of the separator (42) Then the separator (42) sandwiched by the negative and positive electrodes is spirally wound to form the spirally wound electrode unit (4). The uncoated portion of the current collector (45) of the negative electrode (41) projects outwardly of the edge (48) of separator (42) at one axial end of the spirally wound electrode unit (4), and the uncoated portion of the current collector (47) of the positive electrode (43) projects outwardly of the edge (48) of separator (42) at the other axial end of the spirally wound electrode unit (4).

Structure of Current Collector Plates

As shown in FIG. 1, current collector plates (6), (61) are attached by laser beam welding to both ends of the spirally wound electrode unit (4).

Figure 4:
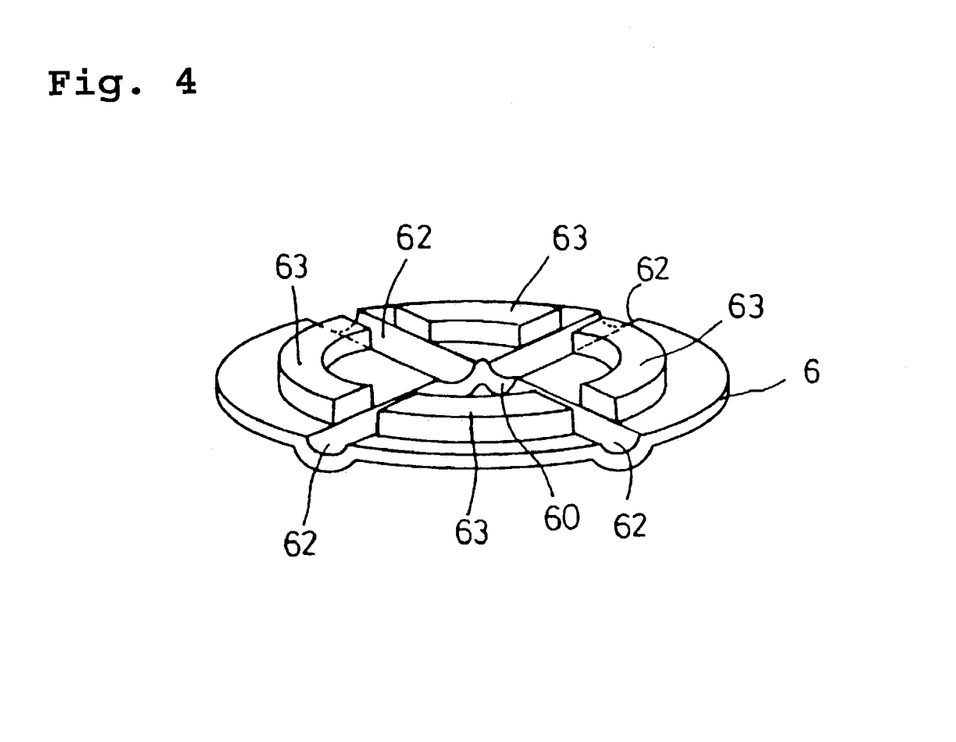
FIG. 4 is a perspective view of a negative electrode current collector plate having connecting pieces.

The current collector plate on the negative electrode side is made of nickel, copper, nickel plated copper or nickel plated iron. As shown in FIG. 4, arc-shaped protrusions (62) (four in FIG. 4) are formed integrally on a circular disk having a center hole (60) and extend radially from the center hole. The protrusions project out the back of the current collector plate, i.e., toward the spirally wound electrode unit (4).

The surface of the current collector plate (6) has four quarter circles each separated by two of the arc-shaped protrusions (62). Four fan shape flat connecting pieces (63) are fixed to the four quarter circles by welding on a line concentrically of the center hole.

Figure 9A:
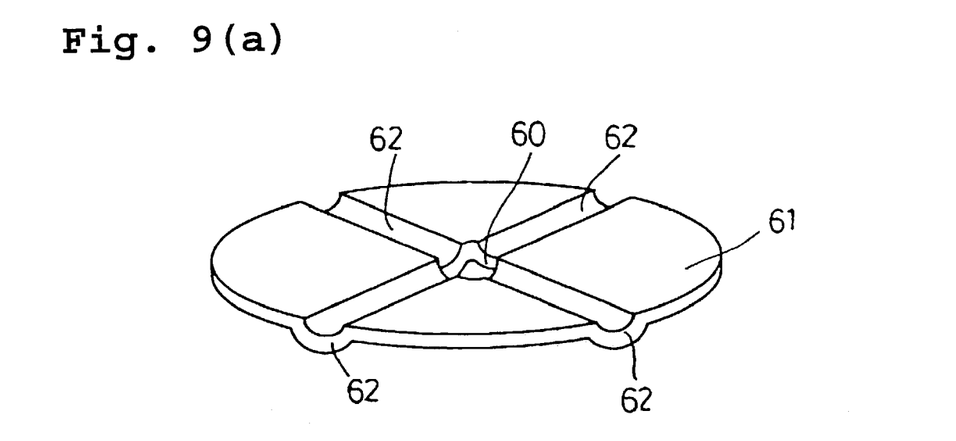
FIGS. 9(a) and (b) are perspective views showing a positive electrode current collector plate and a positive electrode current collector plate having the terminal connector part connected thereto, respectively.

The current collector plate (61) on the positive electrode side is made of aluminum or aluminum alloy. As shown in FIG. 9(a), a plurality of arc shape protrusions (62) (four in FIG. 9) are formed integrally on a disk having a center hole (60) and extend radially from the center hole. The protrusions project from the back of the current collector plate (61), i.e., in the direction of of the spirally wound electrode unit (4).

Figure 9B:
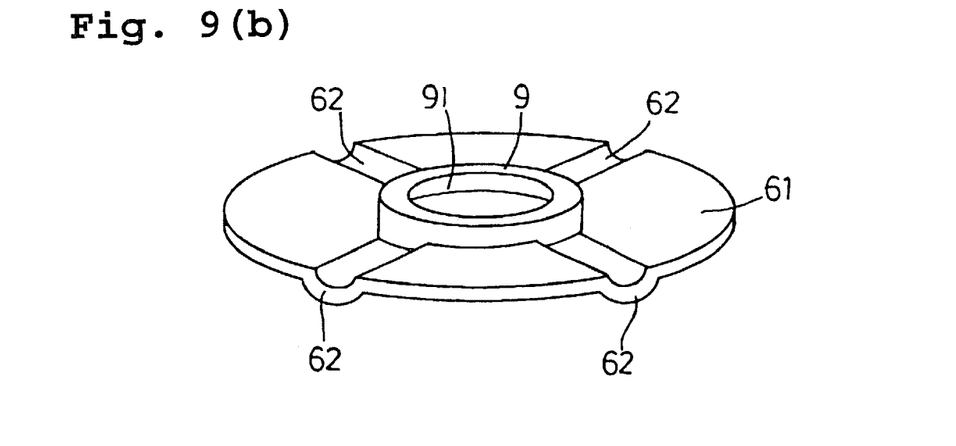

As shown in FIG. 9(b), the surface of the current collector plate (61) has a terminal connector part (9) having a circular recessed portion (91). It is also possible to form the terminal connector part (9) integrally on the disk.

In the step of welding the current collector plates (6), (61) onto both ends of the spirally wound electrode unit (4), the current collector plates (6), (61) press against the spirally wound electrode unit (4). Arc-shaped protrusions (62) of the current collector plates (6), (61) press inwardly into the edge (48) of each of the current collectors to form a connection area comprising the cylindrical contact area between the arc shape protrusions (62) and the current collector edge (48) A laser beam is irradiated to the inside of the arc shape protrusions (62) of the current collector plates (6) and (61) to weld the arc-shaped protrusions (62) to the edge (48) of the current collectors of the spirally wound electrode unit (4).

Terminal Connection Structure on Negative Electrode Side

Figure 3:
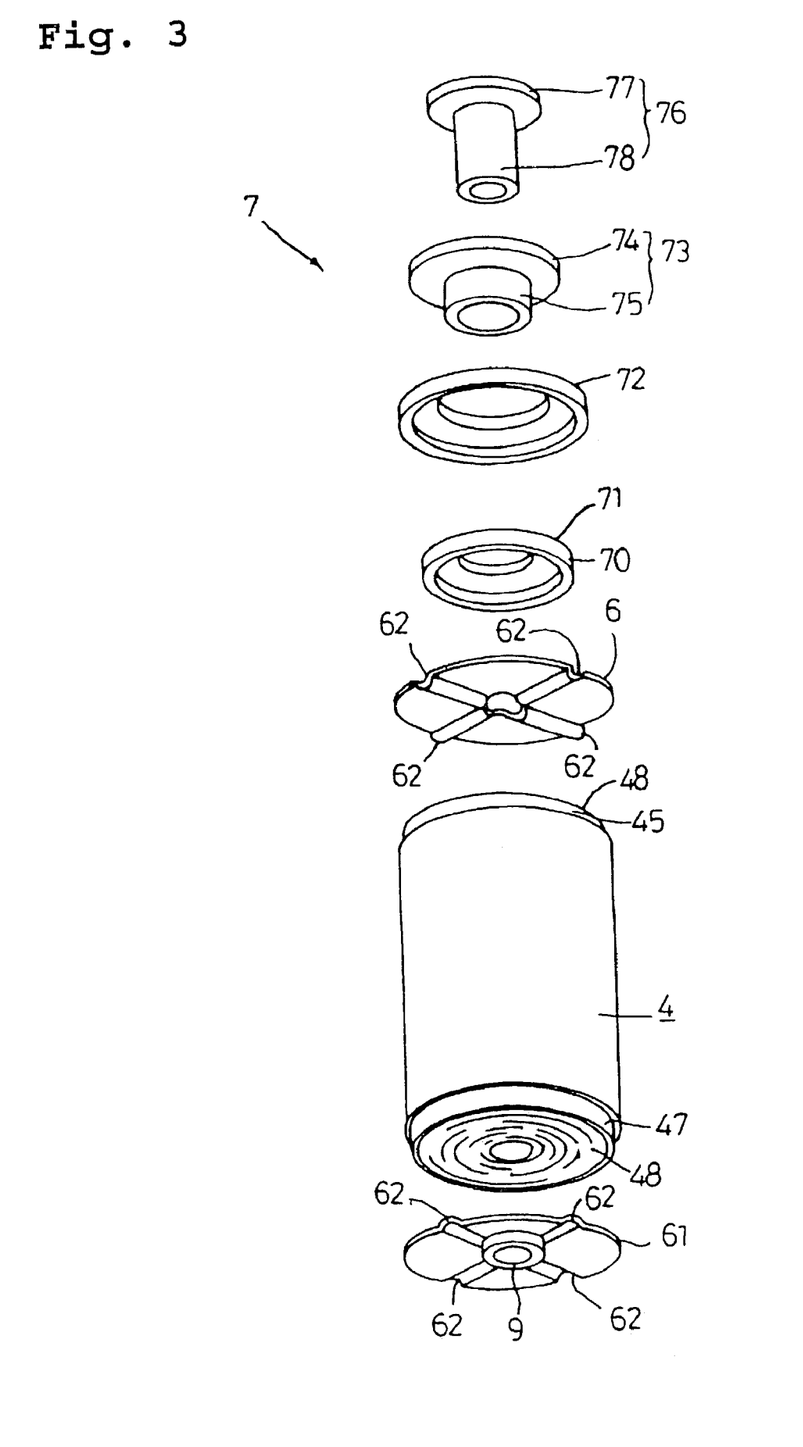
FIG. 3 is an exploded perspective view of a negative electrode terminal assembly.

As shown in FIGS. 1 and 3, the negative electrode terminal assembly (7) comprises a terminal connector (71) having a cylindrical flange portion (70) welded to a plurality of connection pieces (63) on the current collector plate (6), first and second insulators (72), (73) fitted in the center hole of the upper lid (52), a rivet means (76) having a cylindrical shape connecting the terminal connector (71) and insulators (72), (73) to the lid (52), a rubber plug (79) for closing an opening of the rivet means (76), and a negative electrode terminal (8) which covers the rubber plug (79) and is welded on the rivet means (76).

The negative electrode terminal assembly (7) is assembled before an electrolyte is poured in the can except for the rubber plug (79) and the negative electrode terminal (8) After the electrolyte is poured in the can, the rubber plug (79) is mounted on the rivet means (76), and the negative electrode terminal (8) is welded and secured on the rivet means (76).

The terminal connector (71) is made of n ickel, nickel plated iron, copper, nickel plated copper or stainless steel.

The insulator (72) is disklike, and is adhered under pressure onto the back of the lid (52). The insulator (73) is cylindrical, and is adhered under pressure along the inside periphery of the center hole of the lid (52). The insulators maintain an airtight seal between the lid (52) and the negative electrode terminal assembly, and are made of polyethylene (PE); polypropylene (PP); nylon; a fluoroplastic resin such as perfluoroalkoxy (PFA), poly(tetrafluoroethylene) (PTFE); polyphenylene sulfide (PPS) or polyetheretherketone (PEEK).

Figure 6:
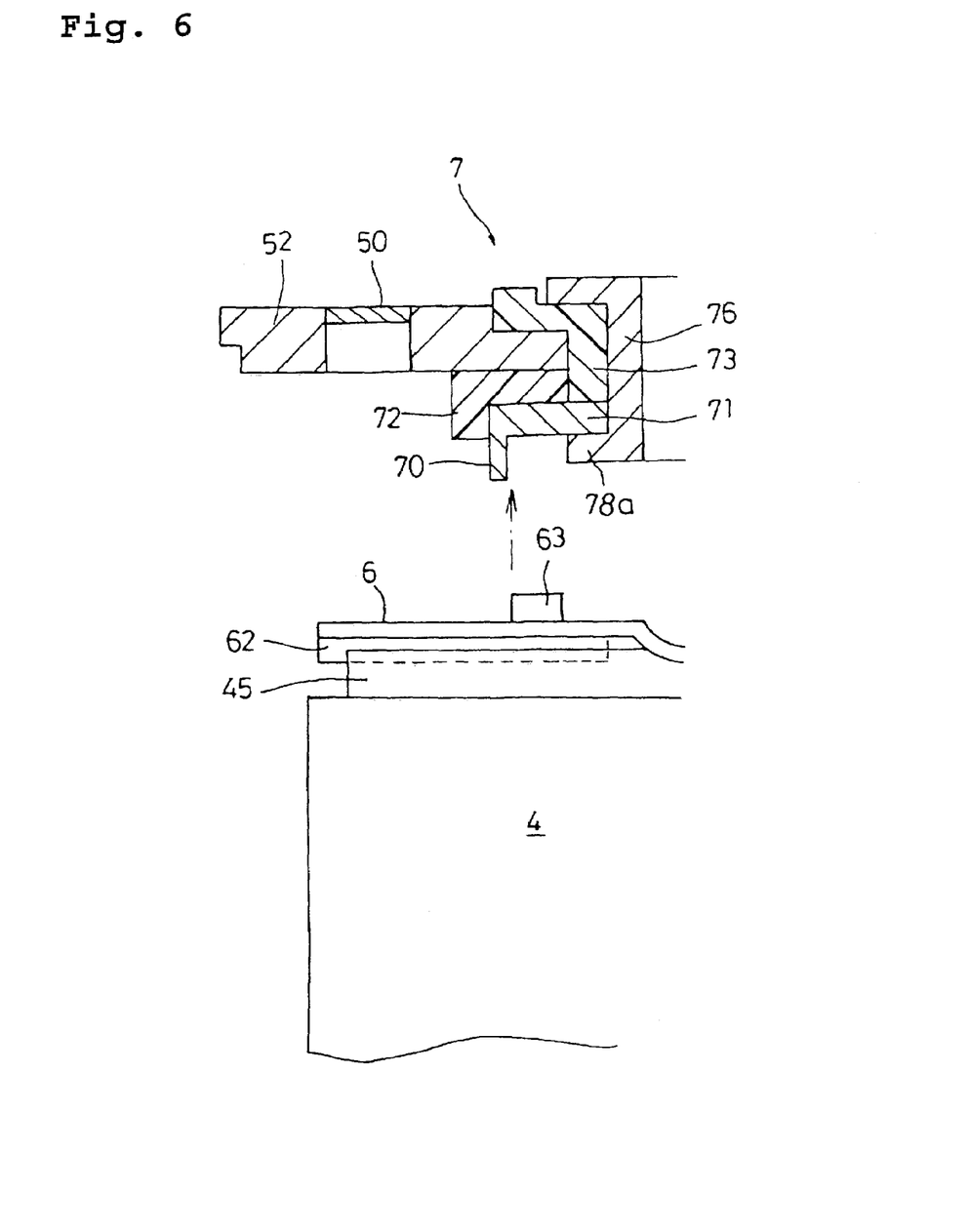
FIG. 6 is a partial view showing the step of connecting the negative electrode current collector plate to the negative electrode terminal assembly.

A material of the rivet means (76) is chosen from nickel plated iron, nickel, copper, nickel plated copper or soft iron. As shown in FIG. 3, a projecting cylindrical part (78) is formed on a back of a disc part (77) of rivet means (76). As shown in FIG. 6, the cylindrical part (78) of the rivet means (76) is inserted into center openings of the terminal connector (71) and insulators (72), (73) which are assembled on the lid (52), and bottom part (78a) of the cylindrical part (78) is caulked to secure the terminal connector (71) and insulators (72), (73) to the lid (52).

The negative electrode terminal (8) has a clad structure consisting of a nickel layer (81) having a thickness of about 0.2 mm and an aluminum layer (82) having a thickness of about 30 μm. Cladding can be performed by a common method such as rolling under reduced pressure to bond the two layers, or with heat. A method in which heating is applied after rolling to form a diffusion layer at the interface between two layers can also be used.

The nickel layer (81) and aluminum layer (82) are uniformly bonded by the process. Therefore, there is no possibility that water or moisture penetrates into the interface between the layers and, thus, electric corrosion caused by contacting of different metals is prevented.

A method for bonding the layers is not limited to cladding. Aluminum plating onto the surface of the nickel layer (81) is also an acceptable method to form the aluminum layer (82).

Figure 7:
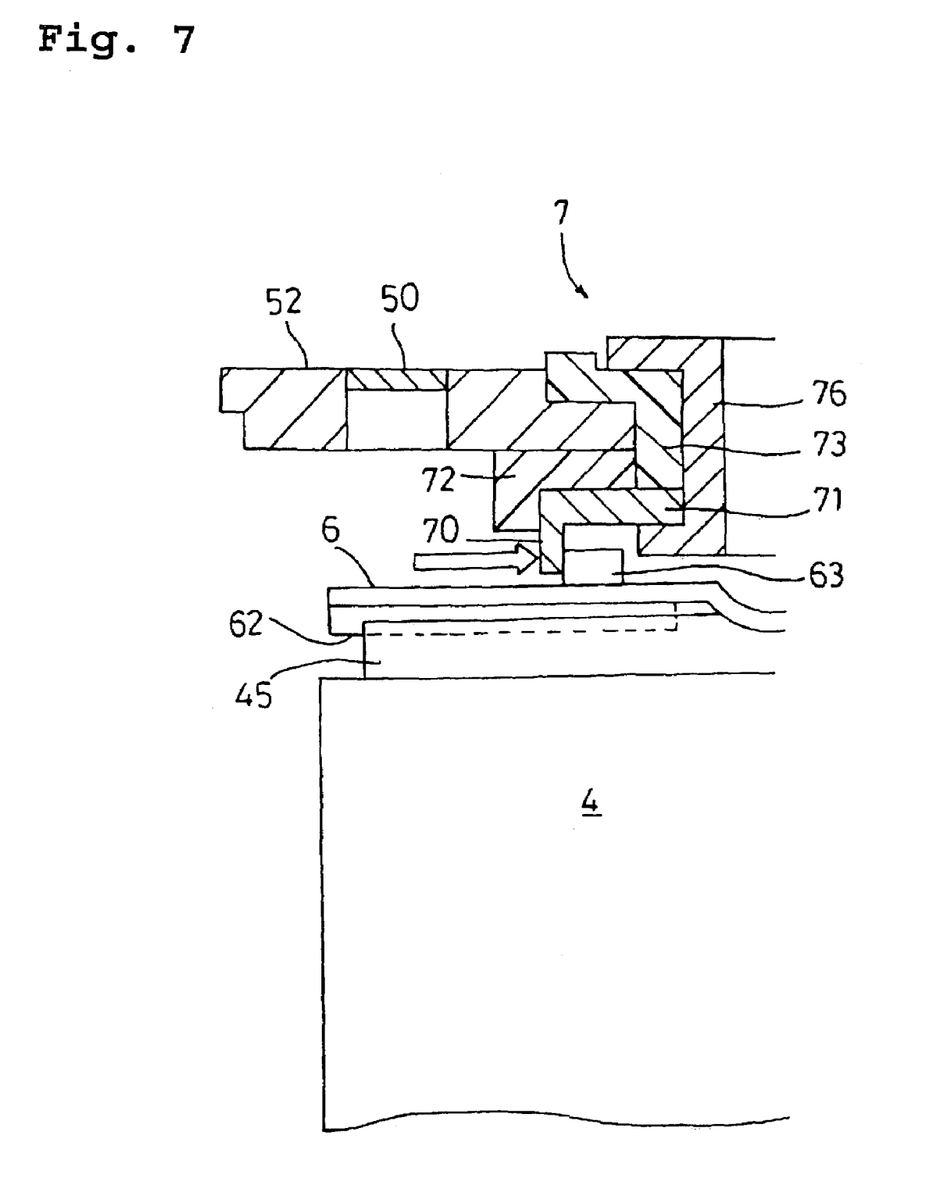
FIG. 7 is a partial view of a portion of the negative electrode current collector plate connected to the negative electrode terminal assembly.
Figure 8:
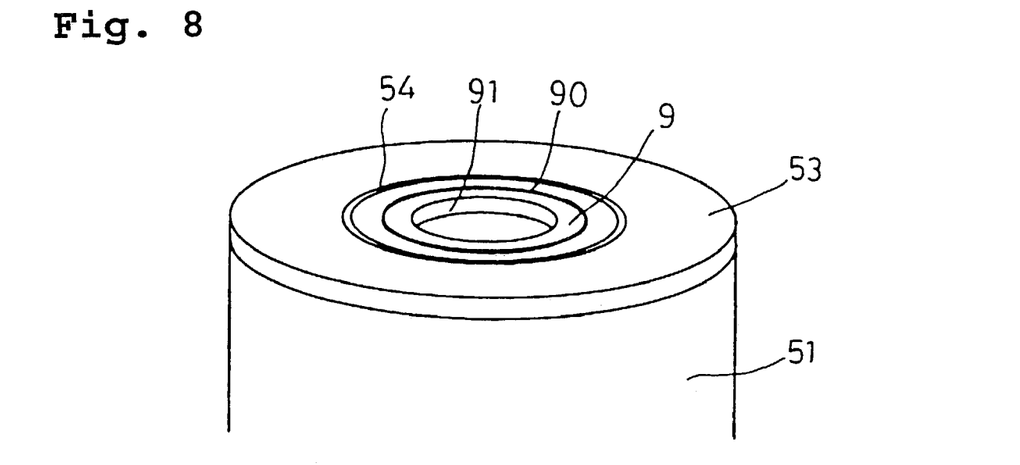
FIG. 8 is a perspective view showing a base lid welded to a terminal connector part.

A plurality of connecting pieces (63) formed on the current collector plate (6) which is on the negative electrode of the spirally wound electrode unit (4) can be adhered to the flange portion (70) of the terminal connector (71). As shown in FIG. 6, the negative electrode terminal assembly (7) is assembled onto the lid (52), and after the current collector plate (6) having the connecting pieces (63) is fixed onto the spirally wound electrode unit (4), the inner peripheral wall of the flange portion (70) of the terminal connector (71) and the outer peripheral wall of the connecting pieces (63) of the current collector plate (6), as shown in FIG. 7, are attached together and irradiated with a laser beam outside of the flange portion (70) of the terminal connector (71) to weld the flange portion (70) of the terminal connector (71) to the connecting pieces (63) of the current collector plate (6).

Figure 5:
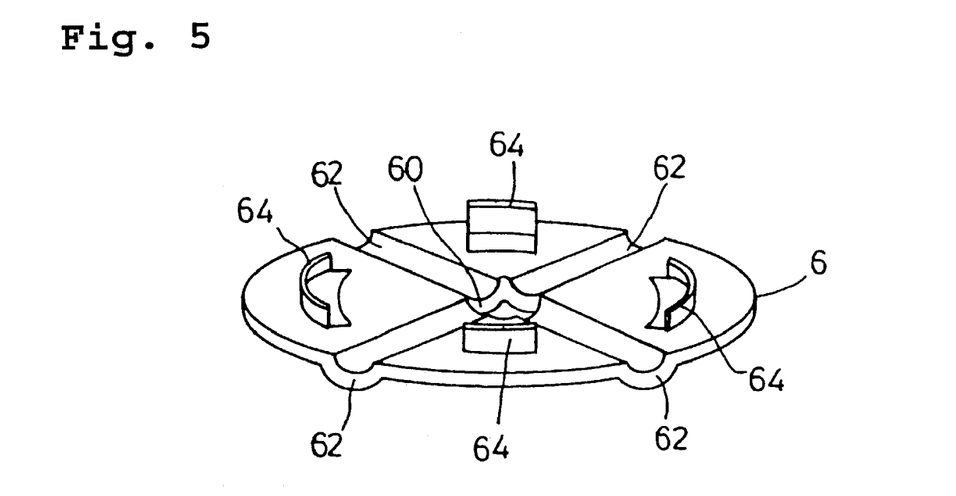
FIG. 5 is a perspective view of a negative electrode current collector plate having connecting pieces of a different shape.

A plurality of connecting pieces (63) can be formed integrally as one piece. The connecting pieces (63) can also be arc-shaped instead of fan shaped as shown in FIG. 5 to form a cylindrical portion to attach to the flange portion (70) of the terminal connector (71). The arc-shaped connecting pieces (64) can be formed by carving the current collector plate (6).

Terminal Connection Structure of Positive Electrode Side

As shown in FIG. 1, the terminal connector part (9) secured on the current collector plate (61) on the positive electrode side of the spirally wound electrode unit (4) is connected to the base lid (53) of the battery can (5).

Figure 10:
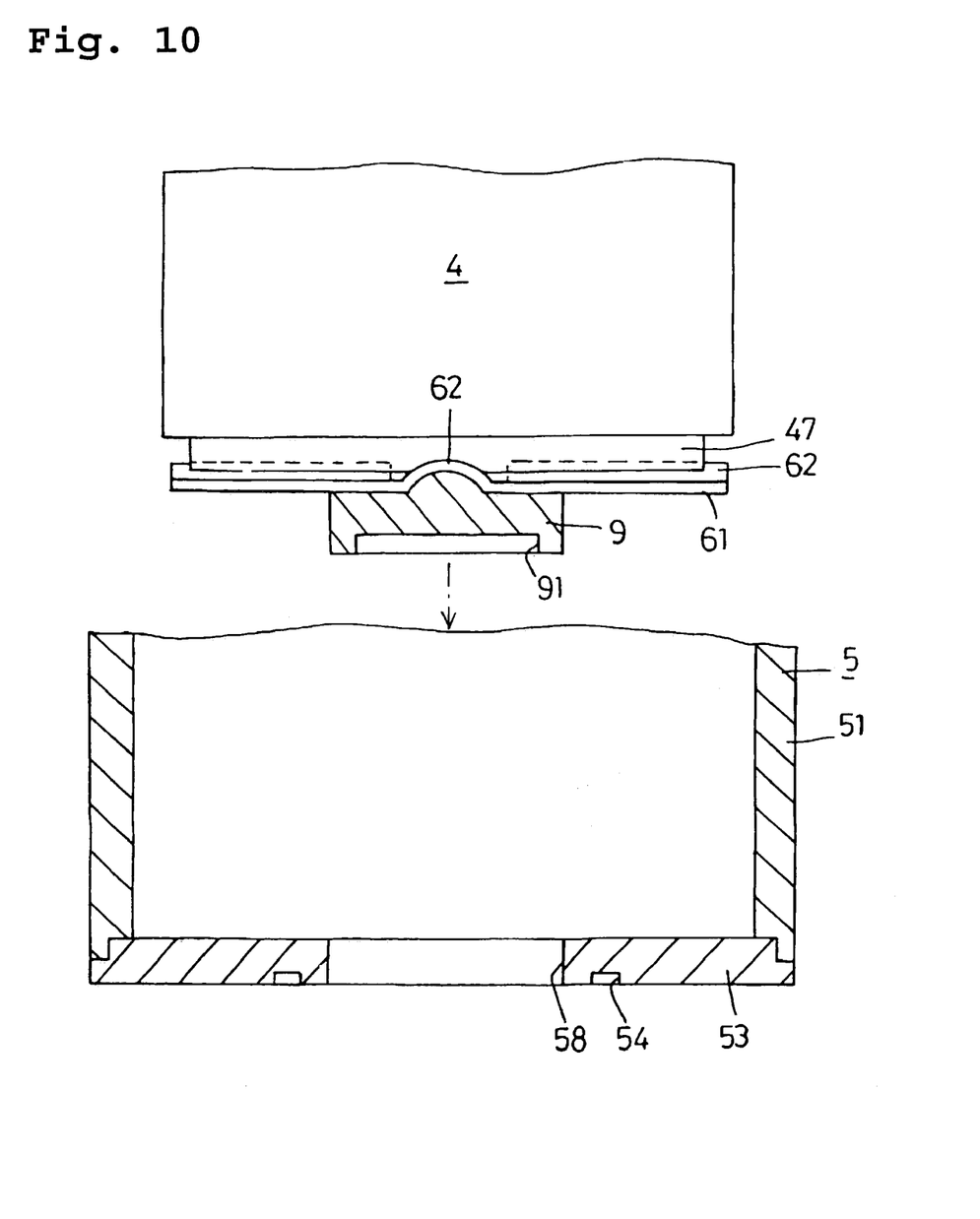
FIG. 10 is a partial view illustrating the step of connecting the terminal connector part to a battery can.

As shown in FIG. 10, the base lid (53) is formed in the center with a hole. (58) having the same inner circumference as the outer circumference of the terminal connector part (9). The terminal connector part (9) is inserted into the center hole (58) of the base lid (53), then, as shown in FIG. 1, the surfaces of the lid (53) and the terminal connector part (9) are made flush and are irradiated with a laser beam from outside of the lid (53) along the circumference to weld the terminal connector part (9) to the lid (53).

In the above explained terminal connection structure, the recessed portion (91) forms a wall inside of weld (90). A groove (54) is also formed along the circumference on the surface of the lid (53) to create a wall outside of weld (90).

The weld (90) is sandwiched by the two walls to inhibit heat radiation during laser beam welding. This prevents a sudden temperature drop at the weld (90) which is a cause of cracking.

Figure 11:
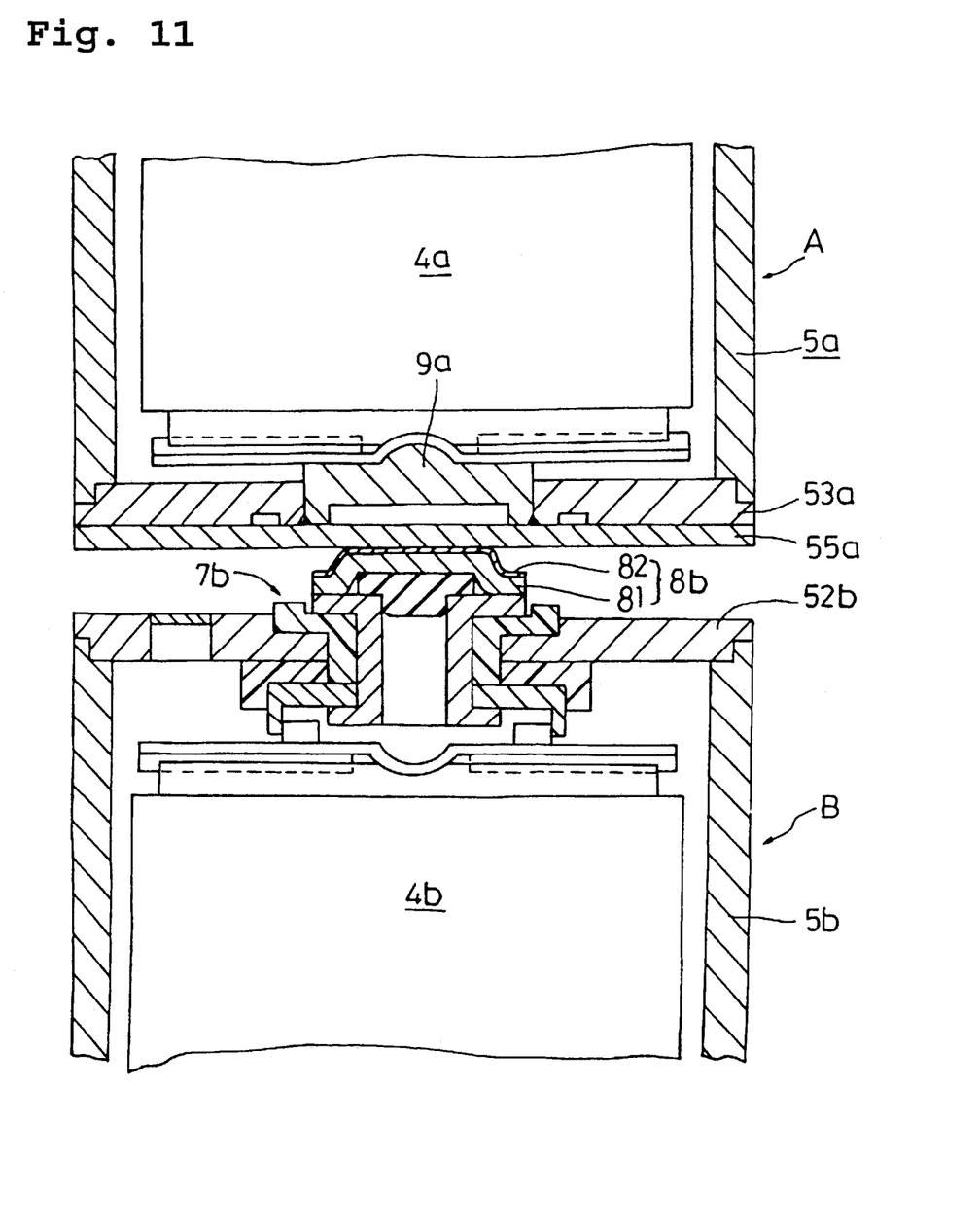
FIG. 11 is a partial view of batteries of the invention connected in series.
Figure 12:
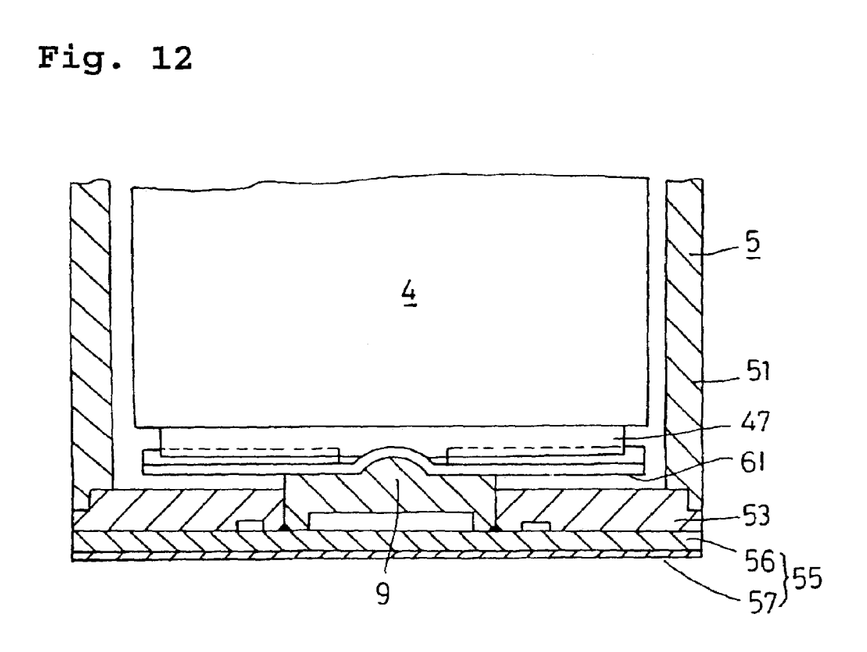
FIG. 12 is a partial view illustrating the construction of a connecting plate having a clad structure secured on the lid of a battery can.

If necessary, a connecting plate (55a) of aluminum can be welded on the surface of the case lid (53) by laser beam welding to form a positive electrode terminal portion having a flat surface as shown in FIG. 11.

As shown in FIG. 11, this structure make it possible to have a definite and stable contact between a negative electrode terminal (8b) of a battery B and the connecting assistant plate (55a) which is a positive electrode terminal of battery A when they are connected in series.

Assembly of Battery

After the spirally wound electrode unit (4) as shown in FIG. 2 is prepared, the current collector plate (6) as shown in FIG. 4 is welded to an edge of the negative electrode of the spirally wound electrode unit (4) by laser beam welding and the current collector plate (61) as shown in FIG. 9(b) is welded to an edge of the positive electrode of the spirally wound electrode unit (4) by laser beam welding.

Then, as shown in FIGS. 6 and 7, the negative electrode terminal assembly (7) is assembled except for the rubber plug (79) and negative electrode terminal (8) and the connecting pieces (63) on the current collector plate (6) are welded to the flange (70) of the terminal connector (71). A laser beam is irradiated outside the flange (70) for welding.

As shown in FIG. 10, the terminal connector part (9) is inserted into the center hole (58) of the lid (53) to place the surface of the terminal connector part (9) flush with the lid (53). The area of contact between the terminal connector part (9) and lid (53) is welded from outside the battery can (5).

Finally, the electrolyte is poured into the battery can (5) from the center hole of the rivet means (76), the rubber plug (79) is inserted in the opening of the rivet means (76), and then the negative electrode terminal (8) is welded on the rivet means (76) to seal the battery can (5) as shown in FIG. 1.

When lithium ion secondary batteries A and B of the present invention are connected in series, the aluminum layer of the negative electrode terminal (8b) contacts the connecting plate (55) made of aluminum of battery A to prevent electric corrosion caused by contact of different metals.

Even if a battery does not include the connecting plate (55), the negative electrode terminal (8b) of the battery B contacts the lid (53a) made of aluminum or the terminal connector part (9) made of aluminum. Therefore, electrical corrosion caused by the contacting of different metals does not occur.

Even if the battery has the connecting assistant plate (55) comprising a clad structure of an aluminum layer (56) and a nickel layer (57) instead of the negative electrode terminal (8) comprising the clad structure of a nickel layer (81) and an aluminum layer (82), the same metals contact each other and electrical corrosion caused by contact of different metals does not occur.

The lithium ion secondary battery of the present invention has a structure that the spirally wound electrode unit (4) connects the negative electrode terminal assembly (7), and the connecting pieces (63) secured on the negative electrode current collector plate (6) are connected directly to the flange (70) of the terminal connector (71) without a tab which is conventionally used to improve productivity and to reduce the length of the current path between the spirally wound electrode unit (4) and the negative electrode terminal (8), to reduce deadspace inside the battery can (5) and to reduce internal resistance.

The lithium ion secondary battery of the present invention has a structure that, to connect the spirally wound electrode unit (4) to the lid (53), which is the positive electrode terminal portion, the terminal connector part (9) is inserted into the central hole (58) formed on the lid (53) to connect the terminal connector part (9) directly to the lid (53) without a tab which is conventionally used after a negative electrode terminal assembly (7) is connected to a spirally wound electrode unit (4). This structure makes it possible to apply laser beam welding from outside of the can to improve productivity and to reduce the length of the current path between the spirally wound electrode unit (4) and the negative electrode terminal (8), to reduce deadspace inside the battery can (5) and to reduce internal resistance.

ADVANTAGES OF THE INVENTION

The present invention simultaneously achieves a reduction in internal resistance and an increase in volume efficiency.

It is of course understood that the present invention is not limited to the embodiments explained above and can be modified within the spirit and scope of the appended claims. For example, polarity of the negative and positive electrodes can be reversed, the spirally wound electrode unit can be housed upside down in the battery can (5) and the negative electrode terminal (8) is changed to the positive electrode terminal and the negative electrode terminal is formed by the battery can (5).

What is claimed is:

1. A battery comprising an electrode unit comprising a negative electrode and positive electrode spirally wound around an axis of the electrode unit as an electricity generating element housed in a battery can, and a pair of negative and positive electrode terminal assemblies for taking the electricity out of the battery, wherein one of said negative and positive electrode terminal assemblies is secured to a lid of the battery, a current collector plate is connected to an edge of an electrode at one end of the electrode unit to electrically connect the electrode unit to said one of said negative and positive electrode terminal assemblies, said current collector plate having one or more than one connecting piece, which is protrusively formed on a surface of the current collector plate and extends in the direction of the axis of the electrode unit on a side of said current collector plate not connected to said edge of an electrode, which one or more than one connecting piece is welded to a flange portion of a base portion of said one of said negative and positive electrode terminal assemblies, said flange portion extending from said base portion in the direction of the axis of the electrode unit on a side of the base portion facing the current collector, to form a welded surface between said one or more than one connecting piece and said flange portion of the base portion extending in the direction of the axis of the electrode unit.

2. The battery according to claim 1, wherein a base portion of said flange portion is a cylindrical flange portion and is connected to an inner circumferential wall or outer circumferential wall of said one or more than one connecting piece and is welded to said one or more than one connecting piece by laser beam welding.

3. The battery according to claim 2, wherein an outer circumferential wall of said one or more than one connecting piece and the inner circumferential wall of the cylindrical flange portion are connected to form a connection, and a laser beam is irradiated onto said connection from outside The flange portion to weld said current collector plate to said one of said negative and positive electrode terminal assemblies.

4. The battery according to claim 3, wherein said one of said negative and positive electrode terminal assemblies is the negative terminal assembly and comprises a terminal connector, at least one insulator which electrically insulates the lid of the battery from the terminal connector, and rivet means connecting the terminal connector and said at least one insulator to the lid.

5. A battery comprising an electrode unit comprising a negative electrode and positive electrode spirally wound around an axis of the electrode unit as an electricity generating element housed in a battery can; a pair of negative and positive electrode terminal assemblies for taking the electricity out of the battery, wherein one of said negative and positive electrode terminal assemblies is secured to a lid of the battery; and a current collector plate connected to an edge of an electrode at one end of the electrode unit to electrically connect the electrode unit to said one of said negative and positive electrode terminal assemblies, said current collector plate having arc-shaped protrusions which extend in the direction of the axis of the electrode unit and contact the edge of said electrode and having one or more than one connecting piece, which is protrusively formed on a surface of the current collector plate and extends in the direction of the axis of the electrode unit on a side of said current collector plate not connected to said edge of an electrode, which one or more than one connecting piece is welded to a flange portion of a base portion of said one of said negative and positive electrode terminal assemblies, said flange portion extending from said base portion in the direction of the axis of the electrode unit on a side of the base portion facing the current collector, to form a welded surface between said one or more than one connecting piece and said flange portion of the base portion extending in the direction of the axis of the electrode unit.

* * * * *